United States Patent
Baudel et al.

(10) Patent No.: US 10,936,958 B2
(45) Date of Patent: Mar. 2, 2021

(54) SEQUENCING OF INPUT PROMPTS FOR DATA STRUCTURE COMPLETION

(71) Applicant: International Business Machines Corporation, Armonk, NY (US)

(72) Inventors: Thomas Baudel, Paris (FR); Wiel A. Bruls, Utrecht (NL); Peter Leijten, Amsterdam (NL); Guilhem Molines, Le Rouret (FR); Robin Schilham, Amsterdam (NL)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 15/444,880

(22) Filed: Feb. 28, 2017

(65) Prior Publication Data

US 2018/0247206 A1 Aug. 30, 2018

(51) Int. Cl.
*G06N 5/02* (2006.01)
*G06F 16/21* (2019.01)
*G06N 5/00* (2006.01)

(52) U.S. Cl.
CPC ............ *G06N 5/025* (2013.01); *G06F 16/21* (2019.01); *G06N 5/022* (2013.01); *G06N 5/00* (2013.01); *G06N 5/02* (2013.01)

(58) Field of Classification Search
CPC ............ G06N 5/00; G06N 5/02; G06N 5/025; G06N 5/022; G06F 16/21; G06F 19/00; G06Q 10/00; G06Q 10/10
USPC ................................................... 706/14, 47
See application file for complete search history.

(56) References Cited

U.S. PATENT DOCUMENTS

| | | | |
|---|---|---|---|
| 2012/0158628 A1* | 6/2012 | Junker | G06F 19/00 706/14 |
| 2013/0247207 A1* | 9/2013 | Hugard, IV | H04L 63/1433 726/25 |
| 2013/0275448 A1 | 10/2013 | Mirhaji | |
| 2014/0143157 A1 | 5/2014 | Jeffs et al. | |
| 2014/0324759 A1* | 10/2014 | Bonnard | G06N 7/005 706/52 |
| 2015/0088772 A1 | 3/2015 | Shwartz et al. | |

(Continued)

OTHER PUBLICATIONS

Unknown, "Web Ontology Language", Wikipedia,, Dec. 1, 2016, 14 pgs.

(Continued)

*Primary Examiner* — Shane D Woolwine
(74) *Attorney, Agent, or Firm* — William H. Hartwell; Maxine L. Barasch; Keohane & D'Alessandro, PLLC

(57) ABSTRACT

Methods and systems are provided for sequencing of input prompts for data structure completion. The method includes: providing a data structure including object classes with typed attributes and rules defining constraints to be met by a data instance of a data structure to meet a regulation body and building a data instance of the data structure by prompting user input via a user interface. The method includes: selecting a working object instance from the top of a stack of object instances; gathering applicable rules for the working object instance with missing required facts in the form of object attributes, including any related rules where a new object class is required; and sequencing input prompts in a user interface of a complex form to obtain the required facts in the form of missing object attributes.

20 Claims, 10 Drawing Sheets

(56) References Cited

U.S. PATENT DOCUMENTS

| | | | |
|---|---|---|---|
| 2015/0278701 A1* | 10/2015 | Danielsson | G06F 16/2365 |
| | | | 706/47 |
| 2016/0078354 A1 | 3/2016 | Petri et al. | |
| 2016/0132297 A1* | 5/2016 | Ferguson | G06F 8/30 |
| | | | 717/113 |
| 2016/0196379 A1* | 7/2016 | Adel | G03F 7/70625 |
| | | | 716/52 |
| 2017/0241798 A1* | 8/2017 | Van Den Bergh | G01C 23/00 |

OTHER PUBLICATIONS

Unknown, "Production system (computer science)", Wikipedia, Nov. 15, 2016, 4 pgs.
Unknown, "Production System", Wikipedia, Oct. 22, 2015, 1 pg.

* cited by examiner

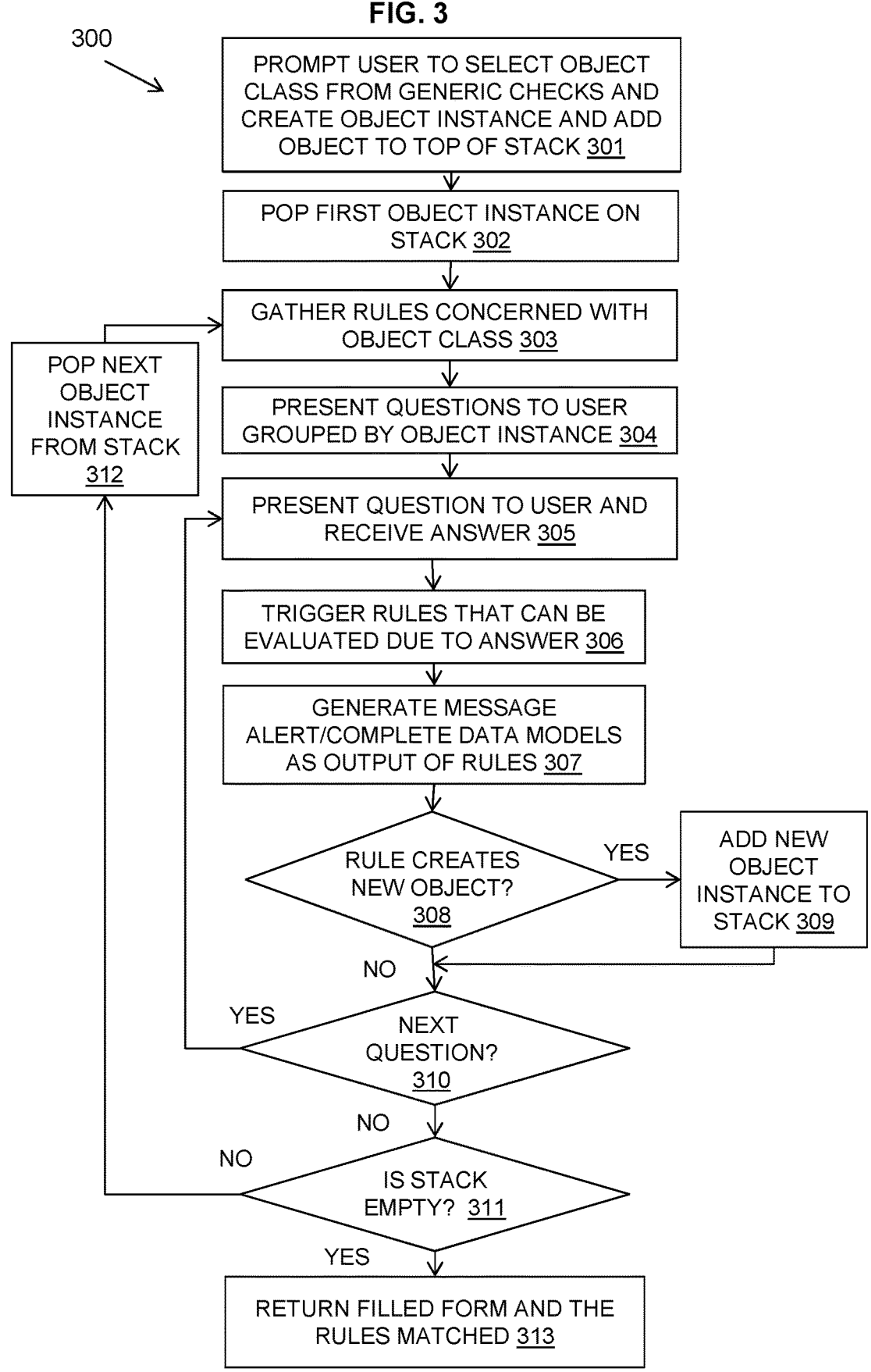

SEQUENCING OF INPUT PROMPTS FOR DATA STRUCTURE COMPLETION

BACKGROUND

The present invention relates to data structure completion, and more specifically, to sequencing of input prompts for data structure completion in rule-based systems.

Many situations require compliance with laws, regulations, policies, etc. Answering a call for a proposition, registering a business or activity, and other projects, especially in regulated markets, require ensuring a variety of constraints are met. The laws, regulations, policies and other constraints are available through a large body of policy and regulation documents. The compliance and regulation-checking task is therefore very tedious and error-prone. Similar situations occur in a variety of business contexts such as: tax assessment, insurance eligibility, immigration permits, environmental permits, etc.

Products are available that turn a complex body of regulations into a computerized model of the concepts at play in a particular domain and the constraints that bind them together.

These products allow parsing a body of texts, first extracting (or requesting the user to manually define) the concepts they deal with as a hierarchy of classes and instances called ontologies, possibly using standardized technologies. Natural language parsers interpret the body of regulations as sets of constraints that have to be met in a particular situation. The process of constructing these ontologies is established and partially automated, still requiring judgment tasks about the proper object model and constraints to suit a particular task.

Once such an ontology and associated rule system have been defined, a form designer is provided with a large set of data objects and rules that need to be instantiated for a particular context for which the system is to be used.

The user of such a system will provide an instance of this semantic model that matches the constraint, and the rules can be executed to verify the compliance of the proposition to this model.

Populating such a data model for appropriate use can be tedious, as there can be hundreds of objects and attributes to inform, and hundreds of relationships to verify. A user should avoid having to enter a piece of data multiple times, avoid having to compute manually something that can be computed from available attributes, and, as much as possible, request the data to be entered in a sequence that is meaningful to the user.

SUMMARY

According to an aspect of the present invention there is provided a computer-implemented method for sequencing of input prompts for data structure completion, comprising: providing a data structure including object classes with typed attributes and rules defining constraints to be met by a data instance of a data structure to meet a regulation body and building a data instance of the data structure by prompting user input via a user interface; selecting a working object instance from the top of a stack of object instances; gathering applicable rules for the working object instance with missing required facts in the form of object attributes; sequencing input prompts in a user interface of a complex form to obtain the required facts in the form of missing object attributes; and executing the rules with the required facts, thereby obtaining an output to be added to the data instance of the data structure and, if a related rule is included, instantiating of a new object class and placing a new object instance on the stack to iterate the sequencing of input prompts and execution of rules when the rules of the current working object instance are exhausted.

According to another aspect of the present invention there is provided a system for sequencing of input prompts for data structure completion, comprising: a data structure including object classes with typed attributes and rules defining constraints to be met by a data instance of the data structure to meet a regulation body and building a data instance of the data structure by prompting user input via a user interface; a working object selecting component selecting a working object instance from the top of a stack of object instances; a rule gathering component for gathering applicable rules for the working object instance with missing required facts in the form of object attributes; a sequencing component for sequencing input prompts of a user interface of a complex form to obtain the required facts in the form of missing object attributes; and a rule executing component for executing the rules with the required facts, thereby obtaining an output to be added to the data instance of the data structure and, if a related rule is included, instantiating of a new object class and placing a new object instance on the stack to iterate the sequencing of input prompts and execution of rules when the rules of the current working object instance are exhausted.

According to a further aspect of the present invention there is provided a computer program product for sequencing of input prompts for data structure completion, the computer program product comprising a computer readable storage medium having program instructions embodied therewith, the program instructions executable by a processor to cause the processor to: provide a data structure including object classes with typed attributes and rules defining constraints to be met by a data instance of a data structure to meet a regulation body and build a data instance of the data structure by prompting user input via a user interface; select a working object instance from the top of a stack of object instances; gather applicable rules for the working object instance with missing required facts in the form of object attributes; sequence input prompts of a user interface of a complex form to obtain the required facts in the form of missing object attributes; and execute the rules with the required facts, thereby obtaining an output to be added to the data instance of the data structure and, if a related rule is included, instantiating of a new object class and placing a new object instance on the stack to iterate the sequencing of input prompts and execution of rules when the rules of the current working object instance are exhausted.

BRIEF DESCRIPTION OF THE DRAWINGS

Embodiments of the present invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 3 is a flow diagram of an example embodiment of an aspect of a method in accordance with embodiments of the present invention;

Figure 1:
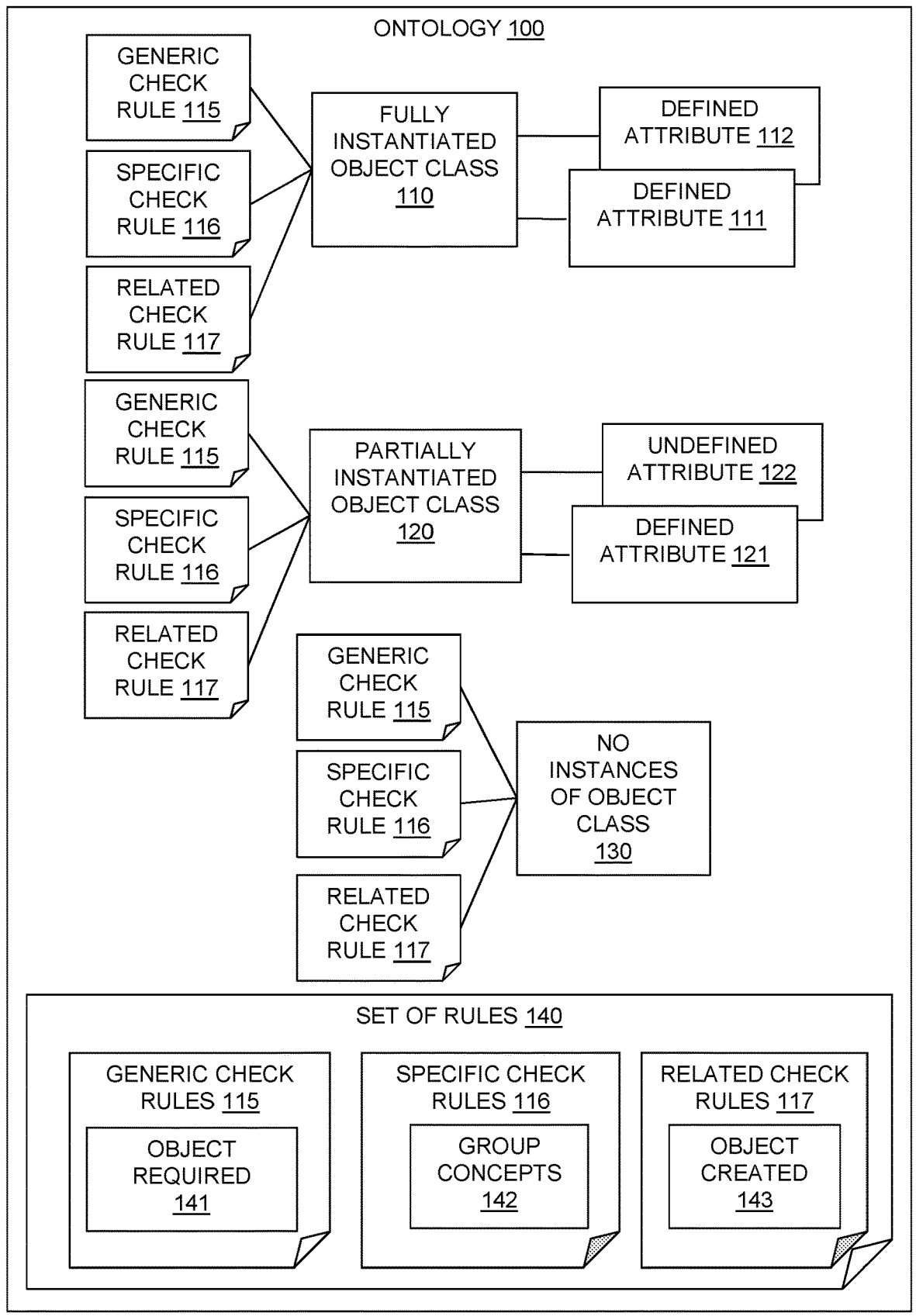
FIG. 1 is a schematic diagram showing an example embodiment of an ontology in accordance with an aspect of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide organization and administration of a complex questionnaire or interactive form so as to ensure an application adheres to a complex body of policies and regulations that are to be met. The starting point is a data structure in the form of an ontology having a set of concepts in the form of object classes comprised of typed attributes and rules or constraints in the form of relationships that the attributes of class instances must maintain. The described method and system map a semantic perspective to govern the rule execution order.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions The described method and system solve the problem of how to sequence dynamically complex items in the form of input prompts required to execute rules.

The described method and system leverage the structure of the ontology and its attached rules to deliver a questionnaire, interactive form, or other information gathering tool in a way that makes sense to the user and avoids redundant and unnecessary entries. This involves setting up a rule flow based on a flat ontology and the structure of the rules as determined through analysis or tagging.

Structure of the flow or sequence includes separating object-instantiating checks from attribute-specific checks so as to allow prompting the user in a sequence that does not mix up high-level and low-level considerations and produces a flow that is natural.

To this effect, the method and system organize the ontology according to the rules that are attached to it by computing an access path ordering the concepts from general to more specific. This may a priori match the user's mental model of the task better. This access path is used in a dialog-oriented interface, which will first ask the most generic and important questions, using the results to filter out unnecessary questions, then move further on to the most specific questions related to the particular situation that has been outlined from the first questions.

This method is ideally suited to rule-based production systems as the evaluation cycle and the mechanisms represent what such a system does.

An alternative mechanism to present the system is as a meta rule-production system. Instead of executing a production rule-based program, a meta-interpreter of the rule system may analyze the ruleset for missing values or objects to enable the triggering of rules, prompting the user in an orderly fashion to complement the information so that the rule system can be executed.

Ontology and Associated Rules

A form designer may generate a data structure in the form of an ontology for a type of project with a body of regulations defined for the project.

The project elements are organized in the ontology, comprising object classes with typed attributes, and instances of those classes. For the purpose of the described method and system, known facts, which are assignments of a value to an object or an object's attribute, are distinguished from unknown facts, which are classes that are not instantiated and object's attributes whose value is undefined. Within those unknown facts, required facts are distinguished, which are facts that appear in the right hand side of rules in the ontology. If those required facts are to become known (through prompting the user for a value), then there is a likelihood that the corresponding rules will be triggered, thereby checking an element of the body of regulations. Other unknown facts are called potentially needed facts.

Each object class is accompanied with "generic check" rules that define the subsets of the regulation body that will need to be activated for the instances of a particular object class. The regulations are defined in the same ontology as the facts known at the beginning of the method, grouping the various concepts existing in the body of regulation and their associated constraints, which are called "specific check" rules. Embodiments include providing a data structure including object classes with typed attributes and rules defining constraints to be met by a data instance of a data structure to meet a regulation body and building a data instance of the data structure by prompting user input via a user interface.

Other rules that are called "related checks" are rules that provoke the production of additional ground facts. When they are activated, these related checks have the effect of prompting another cycle of evaluation within the method.

Sequencing Method

The method organizes a questionnaire, interactive form, or other information gathering tool by first requesting the entry of some main facts that allow at least one generic check to be performed as a starting point of the fact gathering. This will produce a list of generic checks and specific checks that require evaluation and further prompting or questioning to obtain further facts. The process is recursive, meaning there can be a hierarchy of triggers to further questioning. Related checks are the triggers of this recursion.

Questionnaire Delivery

The result of the method can be shown as a list of questions or input prompts ordered according to the method. These may be delivered in a variety of ways in the form of a user interface of a complex form, such as a spreadsheet with nested segments, with follow-up determined. Other presentations are possible, such as a web application with multiple screens, whose follow-up content is automatically adapted according to the answers to the first questions or input prompts. The input prompts are described in more detail as questions presented as a questionnaire; however, it will be appreciated that the input prompt may be a vacant field or other form of prompt for a required fact.

Generated navigation rules automatically trigger the appearance and disappearance of questions or input prompts in a user interface according to the method, in what is referred to as the "dialog builder". The user interface may present itself as a continuously expanded form.

Referring to FIG. 1, a schematic diagram shows an example embodiment of an ontology 100. The ontology 100 is a data structure comprised of object classes 110, 120, 130, each object class composed of typed attributes 111, 112, 121, 122 (strings, numbers, pointers, etc.) to which are associated domain and integrity constraints.

This data structure may be partially instantiated by the form designer, meaning some object classes 110 representing the concepts are fully instantiated with no null/undefined attributes 111, 112, others are partially instantiated 120 meaning there are instantiated objects which have still undefined attributes 122, and other classes of objects 130 have no instances.

A "fact" may be mapped to an object class or one or more of its attributes. For an example object class or "Customer", the "FirstName" and "LastName" attributes may be known facts. The "Address" may be a required fact (a fact that is not currently available, but will be needed since the zip code is a mandatory element of evaluation), and the "Income" may be a potentially needed fact (it may be needed depending of further rule evaluation).

Known facts may be provided by the form designer for a project type and may also be generated during the completion of the questionnaire for an instance of the project as the user provides an answer to a question or fills a field in response to an input prompt.

Known facts are included in the fully instantiated objects of the ontology 100 over which the rules are defined. They hold no missing values, and a rule that refers to this object will not need to prompt the user for some information to be evaluated.

Required and potentially needed facts may be within object instances of the ontology that are partially instantiated 120. The attributes have null or invalid values, meaning the user must be prompted for those values before they can be used by the rules.

Required and potentially needed facts may also be within object classes of the ontology that have no instances defined, but whose values are used in the rules.

The required facts distinguish themselves from the potentially needed facts as they appear in the premises of the first rules of the ruleset: no rules may be triggered without at least some of those facts being instantiated.

A set of rules 140 may be defined describing policies and regulations regarding the values and required sets of constraints that objects 110, 120, 130 of the ontology are to respect. The rules may be defined as "generic check" rules 115, "specific check" rules 116, and "related check" rules 117 which will be described in detail below. An object class 110, 120, 130 may be required for one or more of the types of rules 115, 116, 117.

An example of a rule is: "If the applicant yearly revenue is less than 1M$ over the past few years, then a certification of its debt must be available".

The set of rules is executable and follows the semantics of a Rule Production System, although other embodiments may be implemented with logical rules systems such as Web Ontology Language (OWL), or any typed Turing-complete system.

The regulations in the form of a set of rules 140 may be defined in the ontology 100. Each object class 110, 120, 130 has "generic check" rules 115 that define the subsets of a regulation body that is required to be activated for this class and therefore require an object 141. The set of rules 140 group the various concepts 142 existing in the body of regulation and their associated constraints, which are called "specific check" rules 116. Other rules that are called "related check" rules 117 are rules that require the production of additional ground facts provided by objects 110, 120, 130 from the ontology 100 and therefore create objects 143. When they are activated, these "related checks" have the effect of prompting another cycle of evaluation within the method for further required objects 143.

Some definitions are provided for the terminology used in the description.

A "rule-based program", in its simplest form, is a collection of independent rules. A rule is composed of two program statements: a guard that describes a set of conditions involving the state of the working memory, and an execution statement that describes a set of state changes over the working memory.

EXAMPLE

IF the applicant has been in the same company for less than 2 years AND the applicant is over 22 years old, THEN add a loss of employment insurance to the loan application.

The method is described in terms of this programming paradigm as it makes it easier to describe. However, this paradigm is Turing-complete, meaning any program may be transformed into a similar program expressed in this formalism, and thus the method is not limited to using this formalism.

"Working memory" is a data structure made of objects, classes, etc. which is examined and manipulated by the rule-based program.

A "guard" is made of a set of variable declarations, which are bound to objects of the working memory, and a conjunction of conditions. Each condition (in the canonical form of rules) is made of an attribute to be tested (for instance, "the applicant's age"), an operator (equals, is less . . . ) and an operand, which can be a constant, another attribute or an expression involving both constants and attributes.

A "guarded statement" is a statement, in its simplest form, as a side effect of the program (print, display . . . ) or the assignment of the result of an expression to an object of the working memory, which can be further divided into attribute changes and new object creation or deletion.

Deployed products can involve more complex constructs, for example, using a Business Object Model (BOM), but the more complex constructs can be reduced to those very simple sets of constructs, and there is no loss of generality in considering a rule program in this very simple form.

In a preferred embodiment, this ontology is described as a Business Object Model (BOM), and the rules are defined as a ruleset over this BOM.

Using this programming paradigm the generic check rules, specific check rules and related check rules may be defined as follows.

Rules whose guard requires the existence of yet non-instantiated object in the working memory to be evaluated are called generic checks. Once the object is instantiated, the generic checks become specific checks.

Rules whose guard involve the evaluation of one or more still undefined attributes are tagged as specific checks.

Rules whose statement part provokes the instantiation of a new object are tagged as related checks. Embodiments may include any related rules where a new object class is required.

Figure 2:
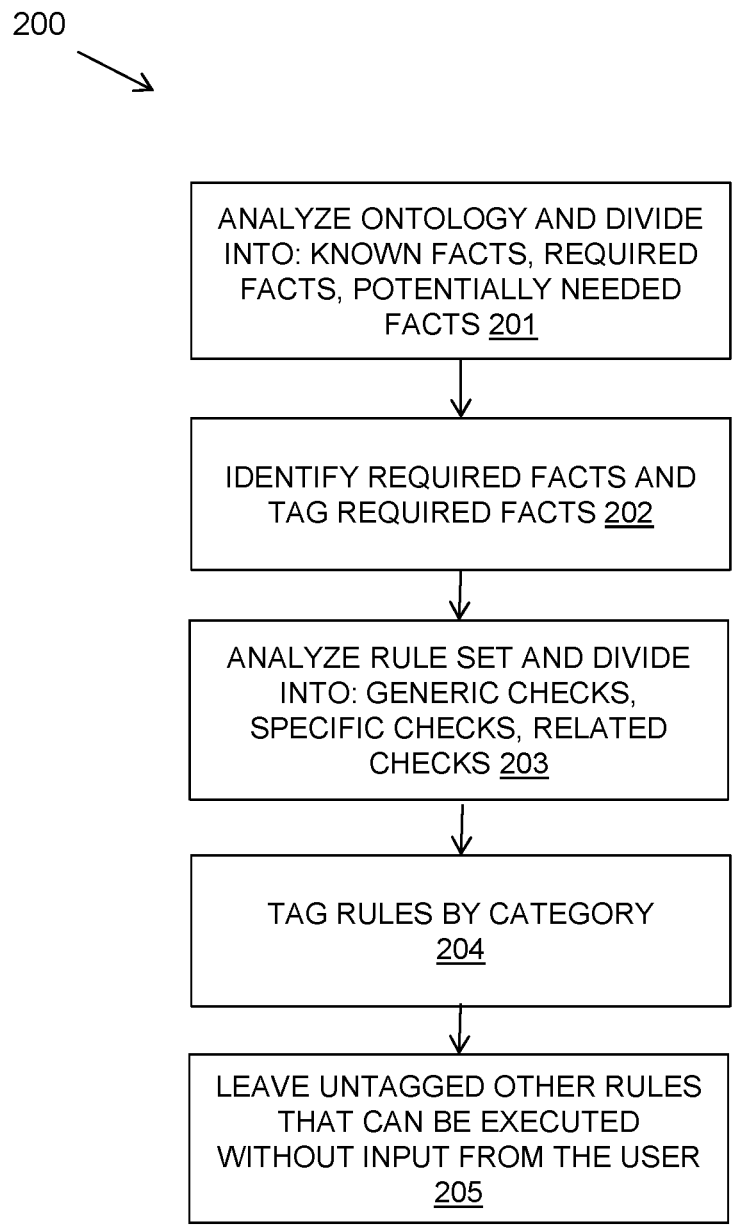
FIG. 2 is a flow diagram of an example embodiment of an aspect of a method in accordance with embodiments of the present invention.

Referring to FIG. 2, a flow diagram 200 shows an example embodiment of an aspect of the described method of generating an ontology with defined rules for a type of project. The ontology may then be instantiated by a user (as shown in FIG. 3) for a particular instance of the project.

The method may analyze 201 the ontology to split it into: known facts, required facts, potentially needed facts.

A non-trivial step of the method is identifying the required facts and tagging the required facts 202 as attributes in the ontology. This may be done either in a preparation phase where the form designer explicitly tags those facts, or through dynamic analysis of the ruleset by running the ruleset a first time. If no rules can be fired, chose as the first required facts, the facts that are referred to in the right hand side of the rule that requires the least un-instantiated facts to be triggered. Other methods to choose the first required facts, base on other heuristics, may be chosen.

The method may analyze 203 the associated ruleset to split it into: generic checks, specific checks, and related checks.

The rules describing policies and regulations follow a canonical structure according to the programming paradigm defined above.

The rules set can be analyzed and the rules tagged 204 as one of the following categories.

Generic checks for rules whose guard requires the existence of yet non-instantiated object in the working memory to be evaluated are called generic checks.

Specific checks for rules whose guard involve the evaluation of one or more still undefined attributes are tagged as specific checks.

Related checks for rules whose statement part provokes the instantiation of a new object are tagged as related checks.

All the rules that can be executed automatically without input from the user are left untagged 205. They will be executed in the flow of evaluation and will not lead to interactive behavior that the method focuses on handling.

The goal of the method is to produce a sequence of questions or input prompts to obtain answers or facts, organized in a structured form, that minimizes the number of questions asked, and provides the questions in a way that makes sense to the user. The most general questions may be asked first, and then more specific questions related to the context. When a question requires the introduction of a new set of questions through instantiation of a new object, this is saved until the more general questions have been completed. The sequence may follow a kind of depth-first traversal of the attributes to specify, until no more questions need to be asked, the form is complete, and no checks are unperformed.

To this effect in an example embodiment, the rule system organizes a data gathering system or questionnaire according to the following method as shown in the flow diagram 300 of FIG. 3. The method is described, which is automated by a computer program.

A partially instantiated ontology with a defined set of rules and analyzed according to the method of FIG. 2, is provided as the basis for the rule system and used to presented questions to a user for completing the required information for a particular project instance.

The rule system takes as entry one or more root object instances, which hold the first necessary information the user needs to provide to start to exercise the method. The user may be prompted 301 to select an object class from the generic checks and create an object instance. The system places this object instance on a stack 302 and the user may be prompted to provide at least some of the missing attributes of this working object instance.

A stack is a container of objects that are inserted and removed according to the last-in first-out (LIFO) principle. Two operations are allowed: push the object into the stack, and pop the object out of the stack. A stack is a limited access data structure in that elements can be added and removed from the stack only at the top: push adds an object to the top of the stack, pop removes the object from the top.

Rules may be gathered 303 that are concerned with the object class. The gathered rules may include generic checks that define the subsets of a regulation body to be activated for the object and the sets of specific checks and related checks concerning this object.

Questions relating to the gathered rules and are presented 304 to the user, grouped according to object instances. The questions prompt the user to provide required facts, which become known facts as defined attributes of the ontology instance.

As each question is presented and answered 305, the rules that can be evaluated are triggered 306 with the output of generating 307 alert messages or completing the ontology instance as needed. As questions are answered additional rules may be gathered for the object instance that require further questions to be answered and the questions build upon themselves.

When one of the triggered rules is tagged as a related check, its execution triggers the instantiation of a new object. It may therefore be determined if a rule has created a new object 308. If so, a new object instance is added to the stack 309 for rule evaluation and question generation to be carried out immediately after the current object has been handled, unless new object instances are generated in the current sequence, in which case they will take precedence, and only then will the rules concerning this object be triggered.

In this way, triggering rules selects both attributes requiring answers in order to evaluate the rules' guards which change from required facts to known facts, and objects requiring instantiation and verification by considering their rules in a later iteration of the method which may be presented as a nested window in the user questionnaire.

If no new object is created 308 or, once the new object instance has been added 309 to the stack, it may be determined 310 if there is a next question to be presented to the user for the current object. If so, the method may loop to present the next question and receive an answer 305 triggering additional rules 306.

The rule-based program may implicitly trigger and evaluate rules in the background as attributes are defined by the user during the completion of the questionnaire, carrying out checks for side effects and checking everything is true.

If there is no next question, the method may determine 311 if the stack of objects is empty. If the stack is not empty, the method may loop to gather rules relating to the object class of the next object instance popped from the stack 312 and the method may iterate. During iterations of the method, further objects may be placed on the stack providing a nesting of questions being provided to the user. Thus, in embodiments, the method is repeated until the stack is empty. Additionally, in embodiments, gathering rules includes gathering more rules as additional required facts become known by the execution of earlier rules.

If the stack of objects is empty, the method may return 313 in an appropriate format: the objects in the ontology that have been edited by the user; the messages left by the execution of the rules; and, additionally, a trace of the checks performed.

The output of the system is a completed set of regulatory forms, with no missing information and a list of the policies and rules that may be contentious given the information provided by the user. Of course this list may be empty, meaning all policies and regulations described by the rules are satisfied. This set of forms is stored as an output parameter of the ruleset.

The specific choice made in the ordering of the objects on the stack ensures that the user will be asked first the most general questions, then proceed in order with questions that are more and more specific, but always related to the nearby questions. The distinction between various types of checks and the order in which objects are stacked enables this consistency to be maintained.

Figure 4A:
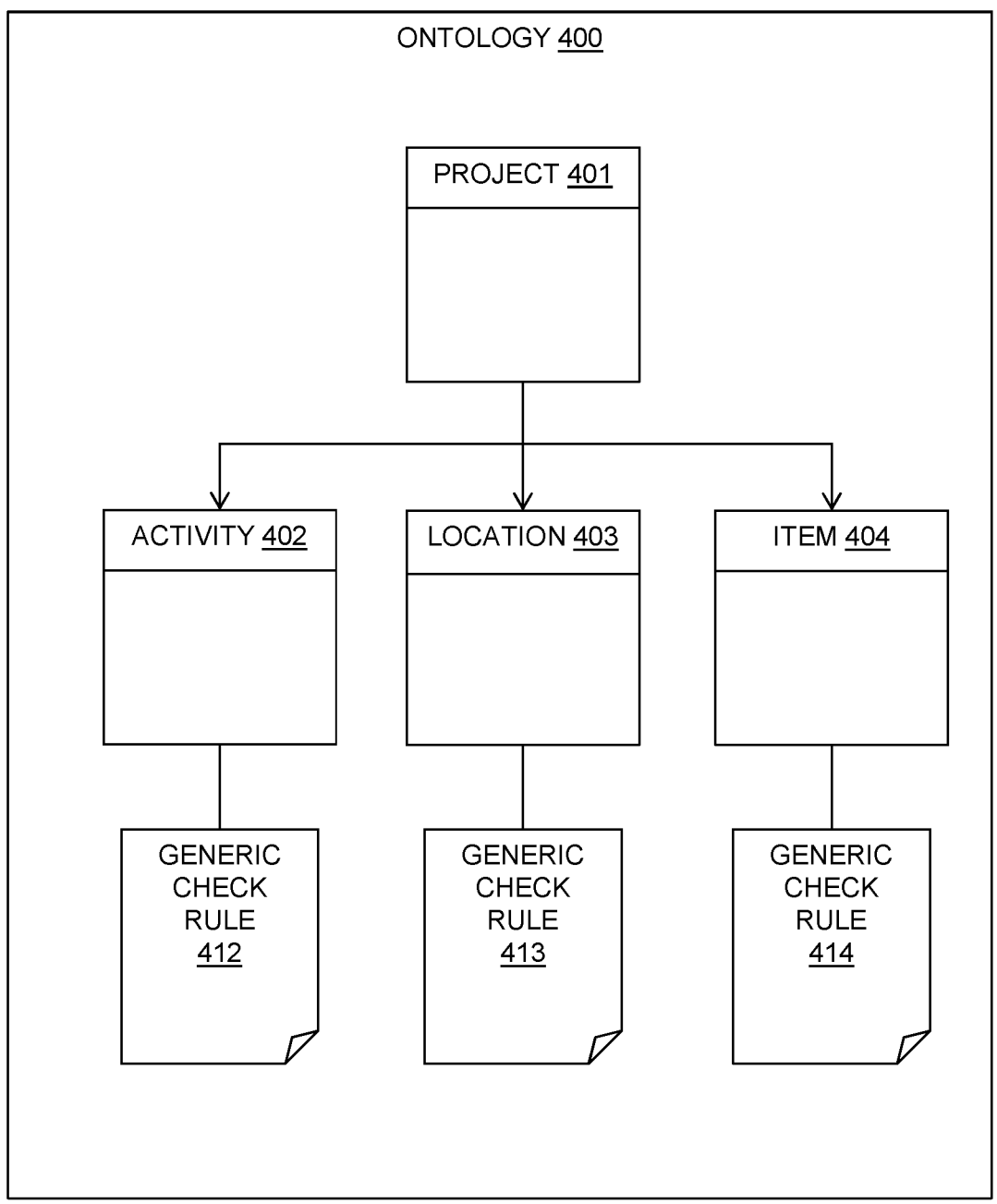
FIGS. 4A and 4B are schematic diagrams showing a worked example of an ontology in accordance with embodiments of the present invention.
Figure 4B:
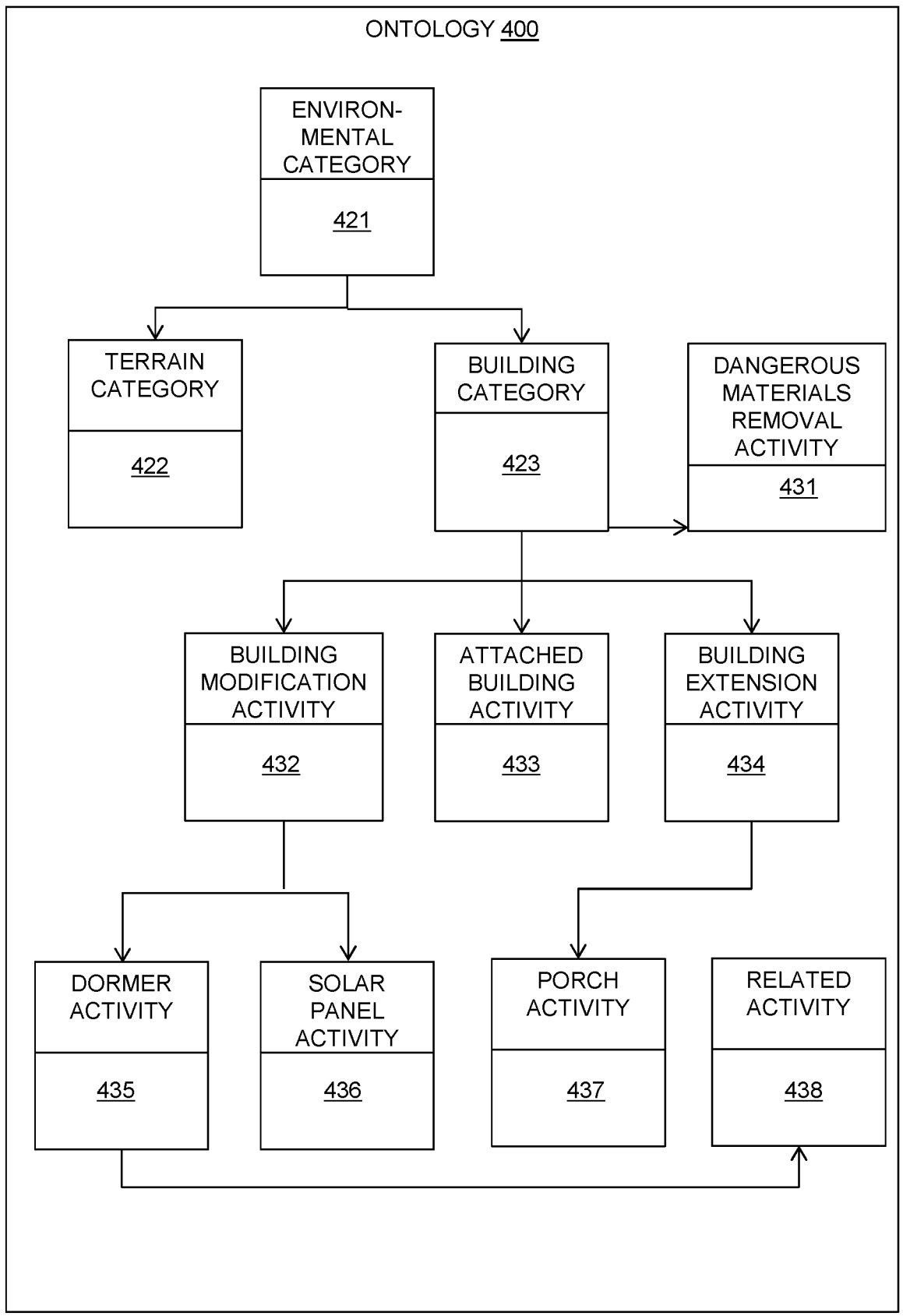

FIGS. 4A and 4B show an example embodiment of an ontology with a ruleset using the situation of assessing the suitability of a building permit request to a set of local regulations.

FIG. 4A shows an ontology 400 with objects defined in the form of "project" 401, "activity" 402, "location" 403, and "item" 404.

The "project" 401 may be defined as an object with attributes of details of the project such as who performs the project (for example, citizen, business).

A child object of "project" may include "activity" 402 defining which activities are to be carried out (for example, building modification, extension, attachment). A generic check rule 412 may be defined for the "activity" 402 such as:

```
IF activity = "building modification",
AND
item=dormer
    THEN ApplicableRules are Dormer activity.
```

A child object of "project" may include "location" 403 defining where the project is to be carried out (for example, city center, suburban area, countryside). A generic check rule 413 may be defined for the "location" 403 such as:

```
IF location = "inner city",
AND
CityStatus=Protected
    THEN License for Building Activity = required.
```

A child object of "project" may include "item" 404 defining which modification item is to be carried out (for example, dormer, solar panel). A generic check rule 414 may be defined for the "item" 404 such as:

```
IF item = "monument",
    THEN Result: License for Building Activity = Required.
```

FIG. 4B shows the regulations defined in the ontology 400. The various concepts in the existing body of regulation are grouped by categories, such as "environmental" 421, "terrain" 422 and "building" 423.

Associated constraints as specific check rules are defined as activities. In this example, under the "building" category 423, constraints include: "dangerous materials removal" 431, "building modification" 432, "attached building" 433, "building extension" 434. The "building modification" 432 activity may have child activities of "dormer" 435 and "solar panel" 436. The "building extension" 434 activity may have a child activity of "porch" 437.

A related check rule may be defined as a further activity, shown as related activity 438 stemming from "dormer" activity 435.

Using this example, the method of sequencing questions of a questionnaire for a building project may be considered. A project data structure in the form of an ontology instance is provided in working memory.

A generic check may be selected and a root object instance may be selected as a blank construction permit and placed on a stack. Some initial known facts may be provided by the user to start the rule evaluation process; for example, a name of the project may be provided as a defined attribute. Without some initial known facts, there is nothing for the rule system to work on.

Rules may be gathered and explored that can be triggered by having a name attribute and questions posed that each prompt a plurality of attribute definitions which are added to the project data structure.

Generic checks may become specific checks if a building permit is fully instantiated. Specific checks may be triggered by provided attribute definitions, which enable the specific checks to be evaluated. For example, providing a name attribute might trigger a specific check to check the name in a database. The provision of an attribute definition may prompt additional undefined attributes that are posed as questions. For example, if a project applicant is provided, a further question may arise as to whether it is a business entity or a non-business entity, the outcome of which might prompt yet further questions.

If a specific rule is tagged as a related rule, it requires the generation of a new object class, which is put on the stack for later completion by questions in the questionnaire. In this way, the current sequence of questions is not interrupted, and a new nest of questions is generated for the object at a later stage of the questionnaire. For example, a rule may determine that a demolition permit is required for the project and a related rule may put an object class for a demolition permit on the stack.

Once the questions have been exhausted for the building permit at a high level, other objects on the stack may be considered, for example, the demolition permit. A blank demolition permit may be provided and rules gathered relating to the demolition permit object to prompt the user for attributes by questions in order to fill out the demolition permit.

Once there are no more objects on the stack, all the required information has been gathered and all forms completed for the project. All the required facts of the instance of the data structure have been converted to known facts.

Figure 5:
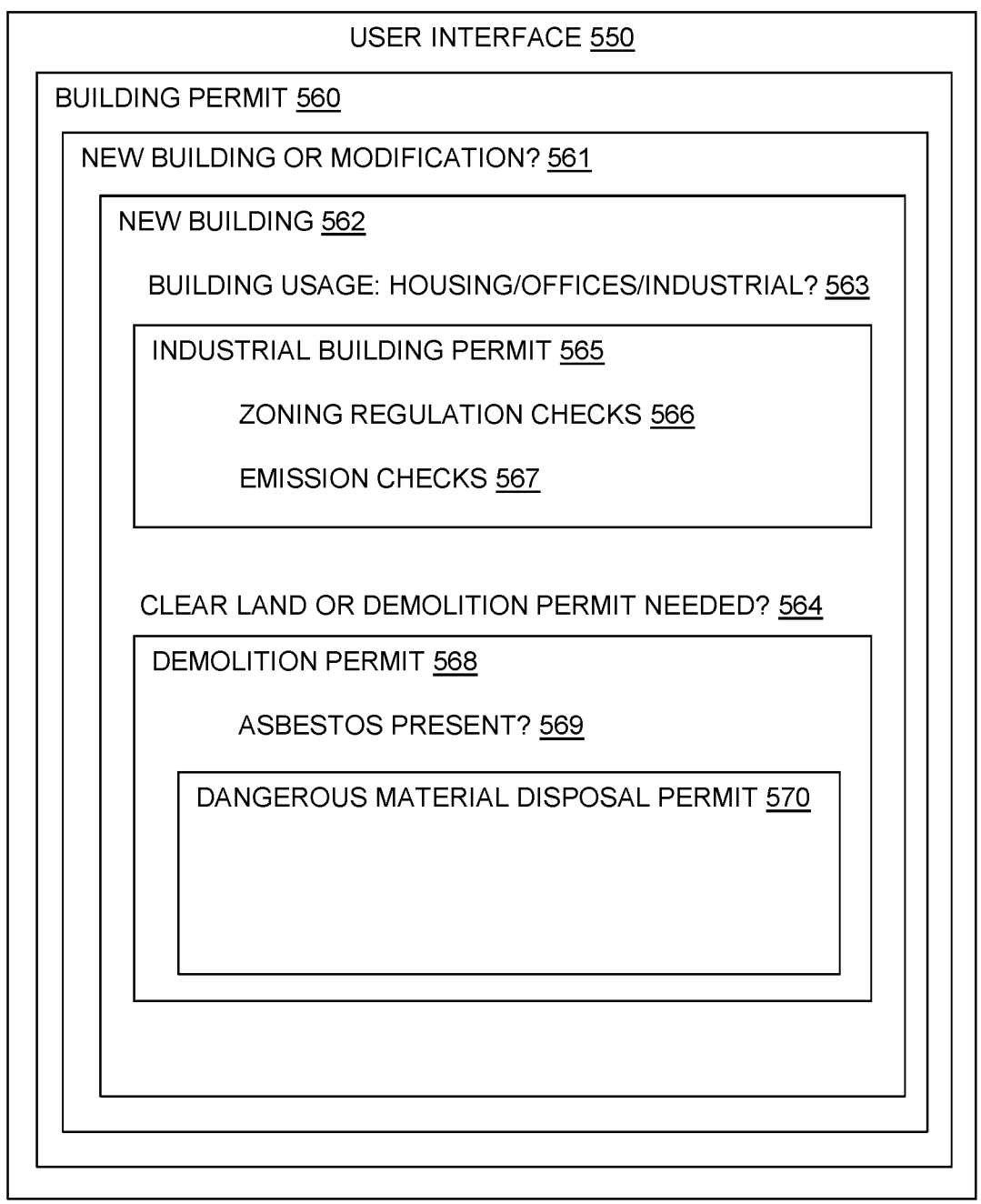
FIG. 5 is an example of a user interface showing an expanded nested form in accordance with an aspect of the present invention.

FIG. 5 shows a resultant user interface 550 presenting a questionnaire to a user with expanded nested questions.

The questionnaire relates to a building permit 560 with a first question 561 of "New building or modification?" If new building 562 is selected, then further questions of "Building usage?" 563 and "Clear land or demolition permit needed?" 564 are presented.

If "Building usage" is industrial, then an "Industrial building permit" 565 is required with "Zoning regulation checks" 566 and "Emission checks" 567.

If "Demolition permit" 568 is required, then a question may arise as to whether there is "Asbestos present?" 569 and, if so, a "Dangerous material disposal permit" 570 is required.

The method ensures that all the questions at a high level are answered before prompting the user to answer questions to fill the industrial building permit 565 or the demolition permit 568.

The areas of business rules, ontologies and business processing areas are addressed, with application domains in business policies compliance, computer-aided management and commerce.

Figure 6:
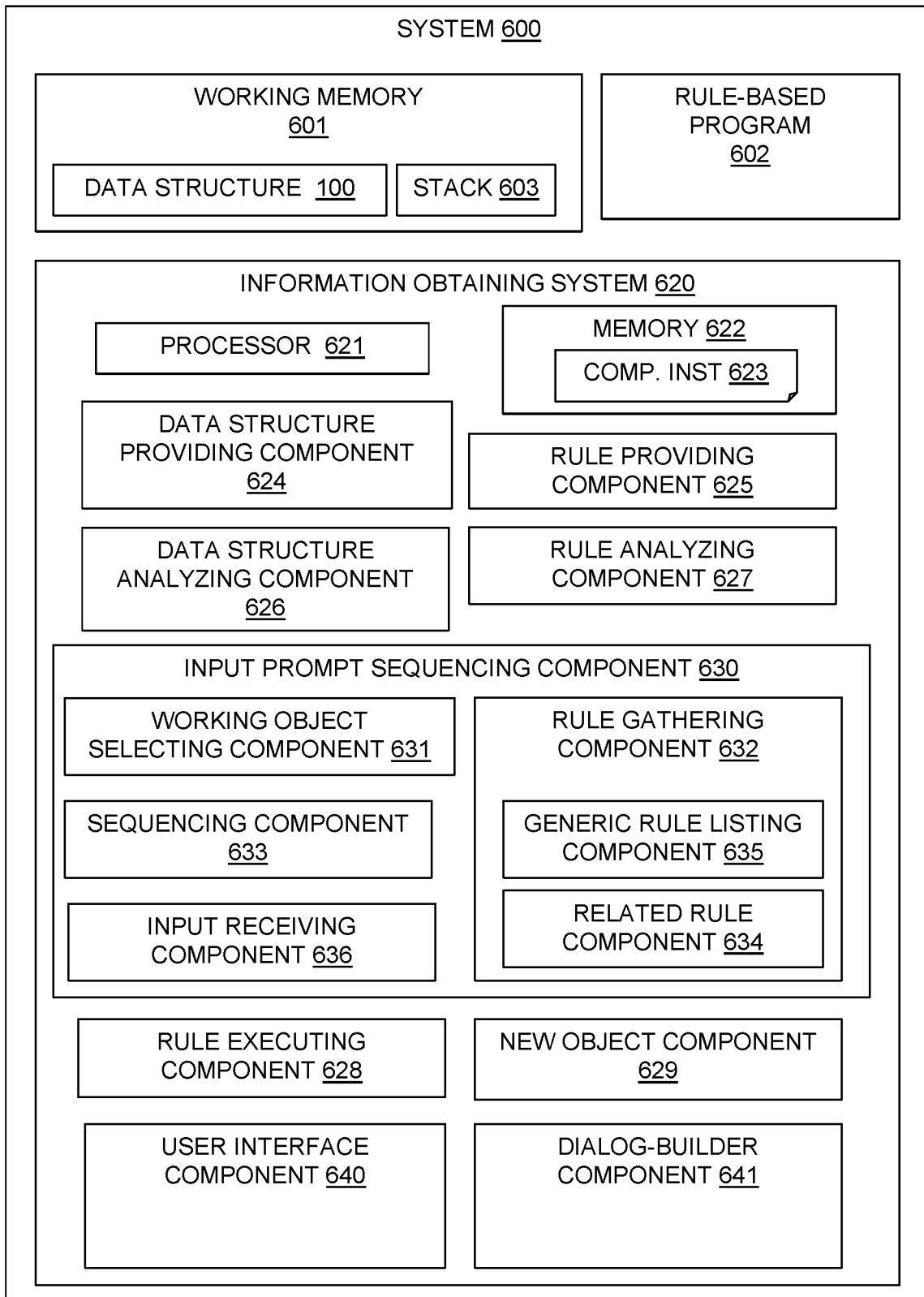
FIG. 6 is block diagram of an example embodiment of a system in accordance with the embodiments of present invention.

Referring to FIG. 6, a block diagram shows an example embodiment of the described system 600. The system includes a working memory 601 holding a data structure in the form of an ontology 100 as it is built and a rule-based program 602 for defining and applying the rules. A stack 603 may be provided in the working memory 601 or in an alternative location in the form of a container of objects that are inserted and removed according to the last-in first-out (LIFO) principle.

The system 600 may include an information obtaining system 620 including at least one processor 621, a hardware module, or a circuit for executing the functions of the described components which may be software units executing on the at least one processor. Multiple processors running parallel processing threads may be provided enabling parallel processing of some or all of the functions of the components. Memory 622 may be configured to provide computer instructions 623 to the at least one processor 621 to carry out the functionality of the components.

The information obtaining system 620 may include a data structure providing component 624 for accessing and building the data structure 100 in the working memory 601 and a rule providing component 625 for accessing the rule-based program 602.

The information obtaining system 620 may include a data structure analyzing component 626 for analyzing the ontology to identify known facts, required facts and potentially needed facts in the form of objects and/or attributes of the data structure 100 and tag the required facts and potentially needed facts.

The information obtaining system 620 may include a rule analyzing component 627 for analyzing the ruleset to divide it into generic checks, specific checks, and related checks and to tag the rules accordingly in the data structure 100. The data structure 100 may be a partially instantiated data structure instances of which may be filled for a particular project by completion of questionnaire by a user as generated by a input prompt sequencing component 630.

The information obtaining system 620 may include the input prompt sequencing component 630 for sequencing the questions or input prompts to be put to a user using a user interface component 640 as generated by a dialog builder component 641.

The input prompt sequencing component 630 may include a working object selecting component 631 for selecting a working object class from the stack 603. This may be a root object instance at the outset of user input prompts that is placed on the stack 603 to be processed.

The input prompt sequencing component 630 may include a rule gathering component 632 including a generic rule listing component 635 for listing generic rules for an object class on the stack 603 where the generic rules define subsets of the regulation body to be activated for the object class.

The rule gathering component 632 may further gather applicable specific rules with missing required facts in the form of object attributes and including a related rule component 634 defining any related rules where a new object class is required. The input prompt sequencing component 630 may include sequencing component 633 for sequencing questions of a complex questionnaire to obtain the required facts in the form of missing object attributes.

The information obtaining system 620 may include an input receiving component 636 for receiving user input which is added to the instance of the data structure 100 and a rule executing component 628 for executing the specific rules with the required facts, thereby obtaining an output to be added to the data instance of the data structure 100. The information obtaining system 620 may include a new object component 629 for instantiating a new object class if a related rule is included and placing the new object class on the stack to iterate the sequencing of questions and execution of specific rules.

The information obtaining system 620 may include a user interface component 640 for presenting the complex questionnaire with sequenced questions to the user. A dialog-builder component 641 may build an expanded nested form for user input.

Figure 7:
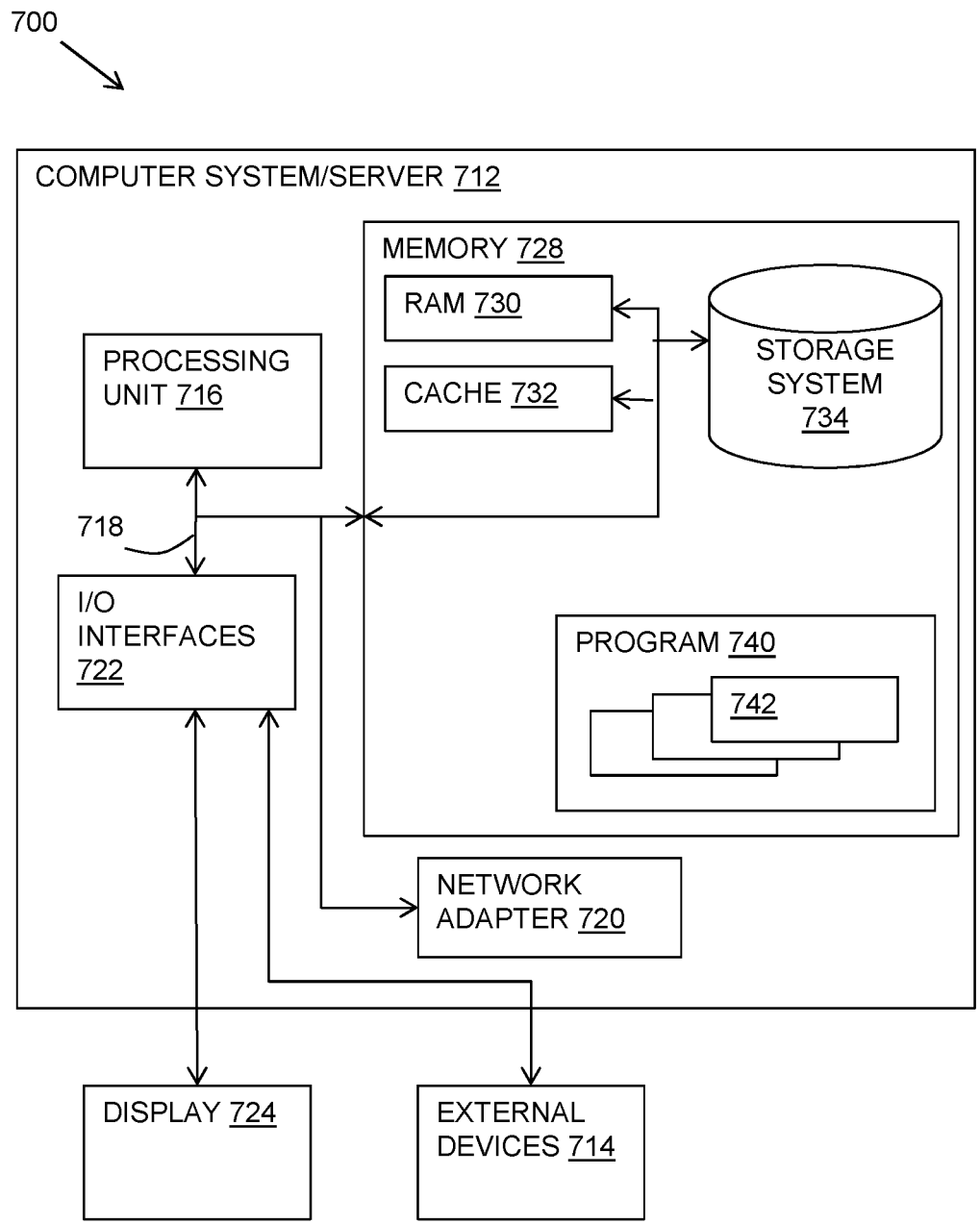
FIG. 7 is a block diagram of an embodiment of a computer system or cloud server in which embodiments of the present invention may be implemented.

Referring now to FIG. 7, a schematic of an example of a system 700 in the form of a computer system or server is shown.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
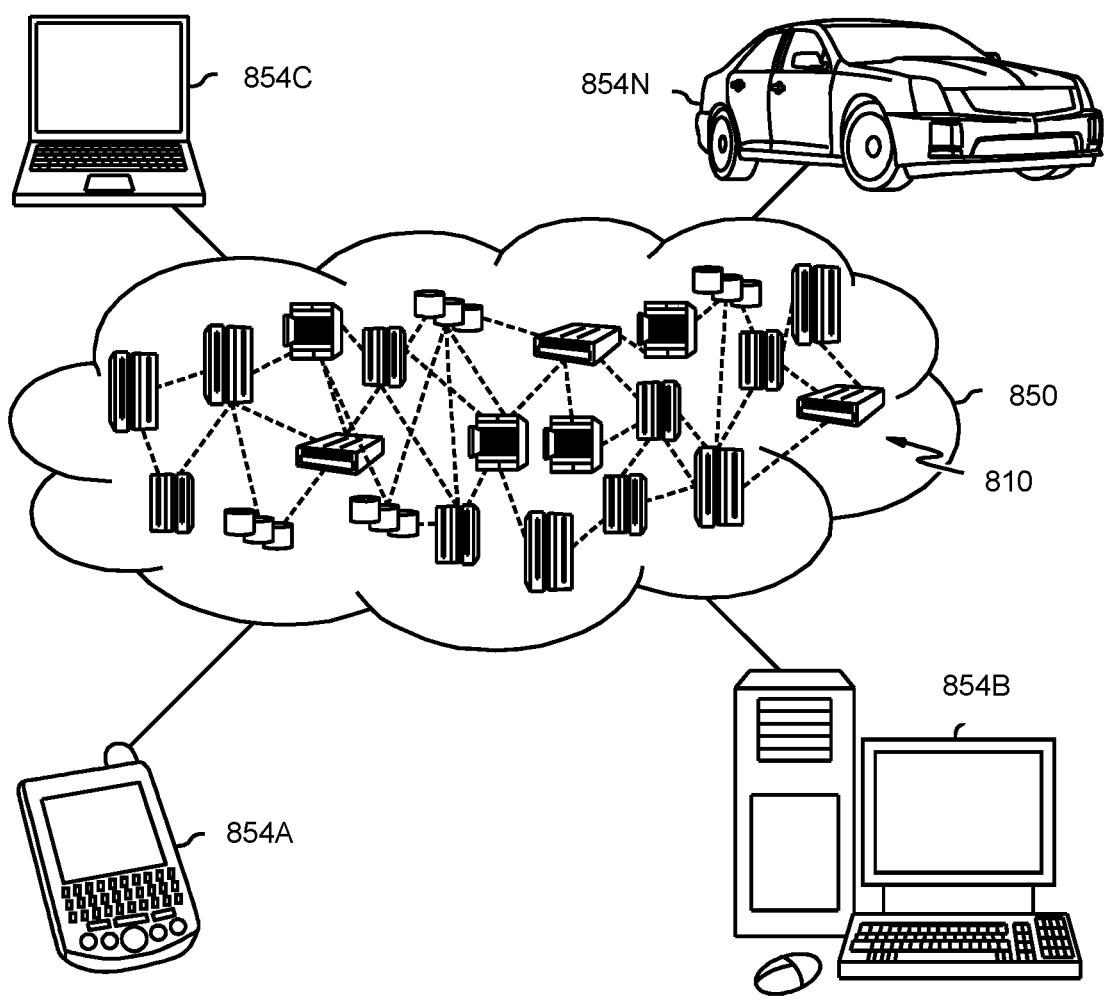
FIG. 8 is a schematic diagram of a cloud computing environment in which embodiments of the present invention may be implemented.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
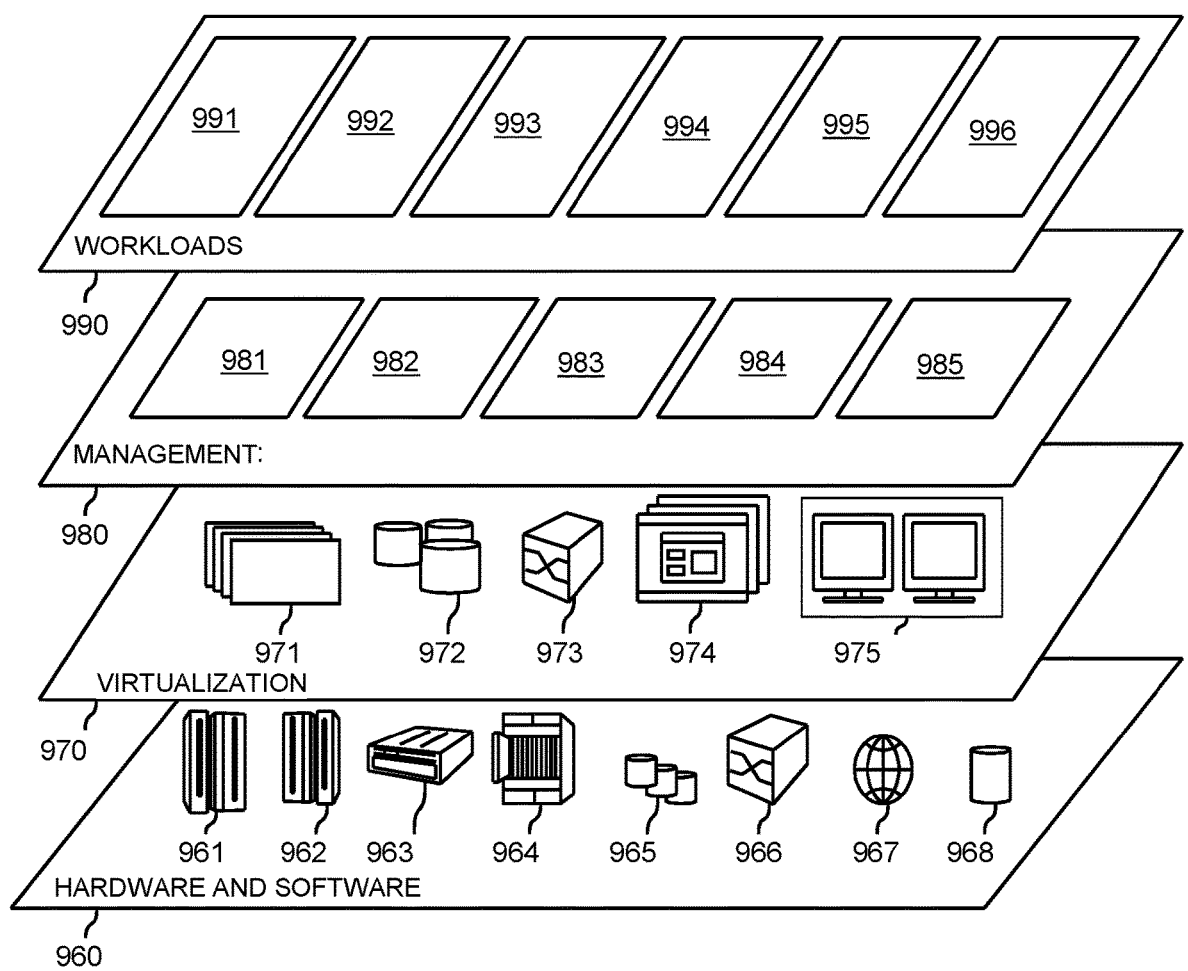
FIG. 9 is a diagram of abstraction model layers of a cloud computing environment in which embodiments of the present invention may be implemented.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and information gathering systems and data structure completion using rule-based systems 996.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for sequencing of input prompts for data structure completion, comprising:
    providing a data structure including object classes with typed attributes and rules defining constraints to be met by a data instance of a data structure to meet a regulation body and building a data instance of the data structure by prompting user input via a user interface;
    selecting a working object instance from the top of a stack of object instances;
    gathering applicable rules for the working object instance with missing required facts in the form of object attributes;
    sequencing input prompts in a user interface of a complex form to obtain the required facts in the form of missing object attributes; and
    executing the rules with the required facts, thereby obtaining an output to be added to the data instance of the data structure and, in response to a related rule being included, instantiating of a new object class and placing a new object instance on the stack to iterate the sequencing of input prompts and execution of rules when the rules of the current working object instance are exhausted; and
    identifying potentially needed facts in the form of missing object attributes and tagging the identified object attributes, initializing each of the potentially needed facts to a null value, and requiring replacement of the null value for each of the potentially needed facts prior to use in rule execution.

2. The method as claimed in claim 1, wherein the method is repeated until the stack is empty.

3. The method as claimed in claim 1, including:
    receiving one or more root object instances of an object class and placing it on the stack, and prompting a user for missing attributes of this working object instance.

4. The method as claimed in claim 3, wherein gathering applicable rules includes:
    gathering generic rules for the working object instance wherein the generic rules define subsets of the regulation body to be activated for the object class; and
    gathering specific rules for the subsets of the regulation body grouped by object instances of the object class.

5. The method as claimed in claim 4, wherein gathering rules gathers more rules as additional required facts become known by the execution of earlier rules.

6. The method as claimed in claim 1, including analyzing the data structure to identify required facts in the form of missing object attributes and tagging the identified missing object attributes, wherein the missing object attributes are needed for a mandatory element of the executing the specific rules.

7. The method as claimed in claim 6, wherein identifying the required facts uses dynamic analysis by running a ruleset for a first time, and in response to no rules being executable, choosing as the first object class, the object class that requires the least un-instantiated object attributes.

8. The method as claimed in claim 7, wherein the potentially needed facts may be needed depending of earlier rule execution.

9. The method as claimed in claim 1, including analyzing the data structure to analyze the rules to categorize the rules in the data structure as generic rules, specific rules, and related rules.

10. The method as claimed in claim 9, wherein specific rules with no required facts are executed without input prompts being generated in the complex form, and wherein the method includes outputting messages created by execution of the rules and a trace of rules performed.

11. The method as claimed in claim 1, wherein the rules are in the form of a guard made of a set of variable declarations, which are bound to objects of the data structure, and a conjunction of conditions made of an attribute to be tested and an operand, which can be a constant, another attribute or an expression involving both constants and attributes.

12. The method as claimed in claim 1, wherein the method is provided as a service in a cloud environment.

13. A system for sequencing of input prompts for data structure completion, comprising:
   a data structure including object classes with typed attributes and rules defining constraints to be met by a data instance of the data structure to meet a regulation body and building a data instance of the data structure by prompting user input via a user interface;
   a working object selecting component selecting a working object instance from the top of a stack of object instances;
   a rule gathering component for gathering applicable rules for the working object instance with missing required facts in the form of object attributes;
   a sequencing component for sequencing input prompts of a user interface of a complex form to obtain the required facts in the form of missing object attributes, wherein the sequencing component performs identifying of potentially needed facts and initializing each of the potentially needed facts to a null value, and requiring replacement of the null value for each of the potentially needed facts prior to use in rule execution; and
   a rule executing component for executing the rules with the required facts, thereby obtaining an output to be added to the data instance of the data structure and, in response to a related rule being included, instantiating of a new object class and placing a new object instance on the stack to iterate the sequencing of input prompts and execution of rules when the rules of the current working object instance are exhausted.

14. The system as claimed in claim 13, wherein the working object selecting component is a root object selecting component for receiving one or more root object instances of an object class and placing it on the stack, and prompting a user for missing attributes of this working object instance.

15. The system as claimed in claim 13, wherein the rule gathering component includes:
   a generic rule listing component for gathering generic rules for the working object instance wherein the generic rules define subsets of the regulation body to be activated for the object class; and
   the rule gathering component gathers specific rules for the subsets of the regulation body.

16. The system as claimed in claim 13, including a data structure analyzing component for analyzing the data structure to identify required facts in the form of missing object attributes and tagging the identified missing object attributes, wherein the missing object attributes are needed for a mandatory element of the executing the specific rules.

17. The system as claimed in claim 13, including a rule analyzing component for analyzing the data structure to analyze the rules to categorize the rules in the data structure as generic rules, specific rules, and related rules.

18. The system as claimed in claim 13, wherein the user interface has an expanded nested form for sequencing input prompts of the complex form.

19. The system as claimed in claim 13, wherein the rule executing component is a rule production system generated from the analysis of the data structure in the form of an ontology and associated policies and regulations.

20. A computer program product for sequencing of input prompts for data structure completion, the computer program product comprising a computer readable storage medium having program instructions embodied therewith, the program instructions executable by a processor to cause the processor to:
   provide a data structure including object classes with typed attributes and rules defining constraints to be met by a data instance of a data structure to meet a regulation body and build a data instance of the data structure by prompting user input via a user interface;
   select a working object instance from the top of a stack of object instances;
   gather applicable rules for the working object instance with missing required facts in the form of object attributes;
   sequence input prompts of a user interface of a complex form to obtain the required facts in the form of missing object attributes; and
   execute the rules with the required facts, thereby obtaining an output to be added to the data instance of the data structure and, in response to a related rule being included, instantiating of a new object class and placing a new object instance on the stack to iterate the sequencing of input prompts and execution of rules when the rules of the current working object instance are exhausted; and
   identify potentially needed facts in the form of missing object attributes and tagging the identified object attributes, initializing each of the potentially needed facts to a null value, and requiring replacement of the null value for each of the potentially needed facts prior to use in rule execution.

* * * * *